(No Model.)
R. MATTHAI.
ANIMAL TRAP.
No. 350,261. Patented Oct. 5, 1886.
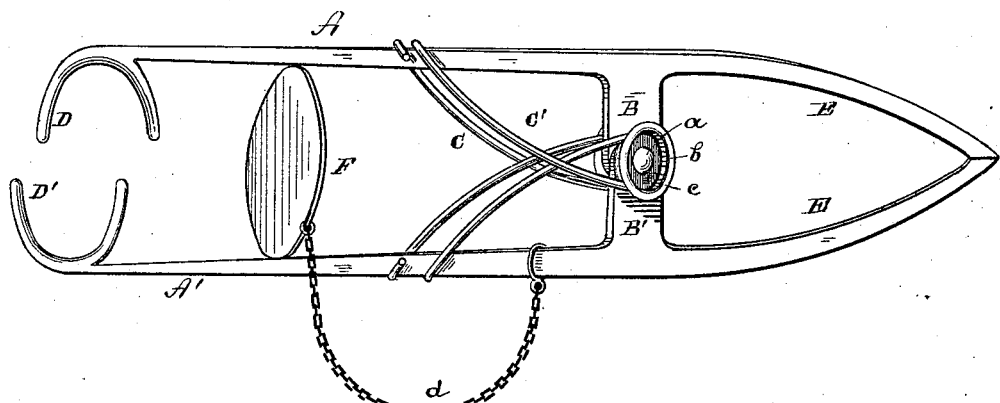
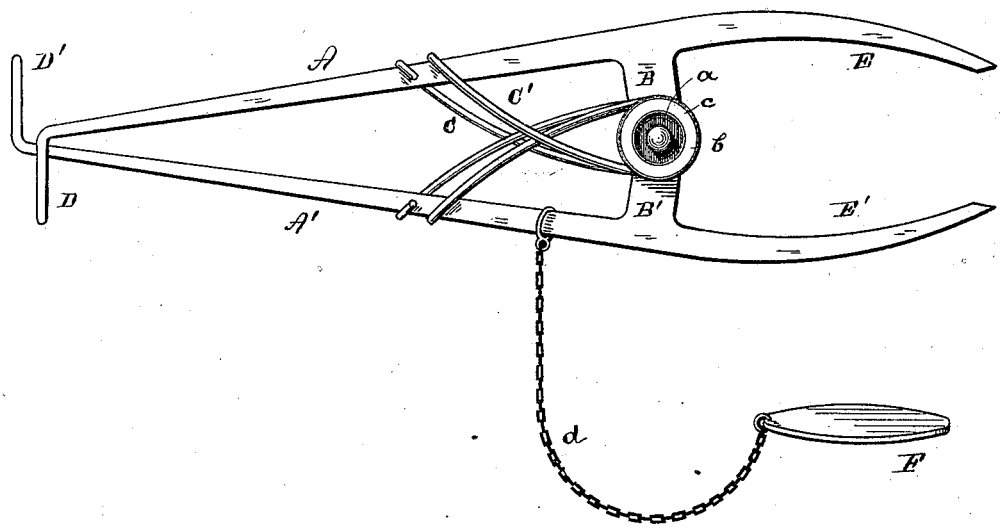
WITNESSES:
D. D. Mott
C. Sedgwick
INVENTOR:
R. Matthai
BY Munn & Co
ATTORNEYS.

UNITED STATES PATENT OFFICE.

RICHARD MATTHAI, OF SAN FRANCISCO, CALIFORNIA.

ANIMAL-TRAP.

SPECIFICATION forming part of Letters Patent No. 350,261, dated October 5, 1886.

Application filed May 27, 1886. Serial No. 203,432. (No model.)

*To all whom it may concern:*

Be it known that I, RICHARD MATTHAI, of San Francisco, in the county of San Francisco and State of California, have invented new and useful Improvements in Traps, of which the following is a specification, reference being had to the annexed drawings, forming a part thereof, in which—

Figure 1 is a perspective view showing the trap set. Fig. 2 is a side elevation showing the trap sprung.

Similar letters of reference indicate corresponding parts in both figures of the drawings.

The object of my invention is to provide a simple, effective, and inexpensive trap adapted to be placed in the burrows or runways of gophers and other burrowing animals.

My invention consists in the construction and arrangement of parts, as will be hereinafter fully described and claimed.

The jaws A A' are provided with ears B B', whose ends overlap each other and are secured by a single rivet, a, passing through both the ears and through cup-shaped washers b. The cup-shaped washers are provided with flanges c around their outer edges, between which and the ears B B' are received the springs C C'. These springs are similar in form, but oppositely arranged with respect to each other, and are made by coiling spring-wire into a spiral in the middle of its length for receiving the cup shaped washer b, and the ends of the wire are crossed and provided with hooks which receive the jaws A A'. Arranged in this way, the springs C C' tend to force the jaws A A' toward each other. The jaw A is a little shorter than the jaw A', and upon the ends of the jaws there are curved cross-arms D D', which are formed on approximately circular curves and are oppositely arranged with respect to each other, the curved cross-arm D being arranged to close inside of the cross-arm D' when the trap is sprung. The jaws A A' are prolonged beyond the ears B B', forming handles E E', which are curved toward each other. A metal disk, F, preferably of circular form, is connected with the jaw A' by a chain, d.

The trap is set by pressing together the handles E E', thus separating the jaws A A', and inserting the disk F between the jaws at a distance of two or three inches from the cross-arms D D', thus holding the jaws open against the pressure of the springs C C'. After the trap is set in this manner it is placed in the burrow of the gopher, care being taken that the disk F and jaws A A' are not in contact with the sides of the burrow. A stake is driven through the back of the trap, or a cord is attached to the trap and to some fixed support, to prevent the gopher from dragging the trap into the burrow when he is caught. The gopher in passing along the burrow enters between the curved arms D D', and by striking the disk F releases the jaws A A', so that they are forced toward each other by the springs C C', firmly grasping the body of the animal between the curved arms.

It is well known that gophers are wary and not likely to enter traps having sharp points or prongs. My improved trap has no prongs and affords no noticeable obstruction, so that the gopher may freely enter the trap.

Having thus described my invention, what I claim as new, and desire to secure by Letters Patent, is—

In a trap, the combination, with the jaws A A', provided with the ears B B', pivoted to each other, and with curved arms D D' at their free ends, of the cup-shaped washers b, provided with flanges c, the springs C C', received on the cup-shaped washers and arranged to force the jaws together, the rivet a, connecting the ears B B' and holding the washers b in position, the disk F, and the connecting-chain d, substantially as herein shown and described.

RICHARD MATTHAI.

Witnesses:
WM. J. BRENER,
ADOLF STAACKE.